United States Patent [19]

Szekacs

[11] Patent Number: 4,891,541
[45] Date of Patent: Jan. 2, 1990

[54] HEADLIGHT SYSTEM FOR MOTOR CARS
[75] Inventor: Gyorey Szekacs, Budepest, Hungary
[73] Assignee: Egyesult Izzolampa es Villamossagi RT, Hungary
[21] Appl. No.: 229,800
[22] Filed: Aug. 2, 1988

Related U.S. Application Data

[63] Continuation of Ser. No. 820,079, Nov. 26, 1985, abandoned, which is a continuation of Ser. No. 553,381, Nov. 18, 1983, abandoned.

[51] Int. Cl.$^4$ ............................................. H01J 61/34
[52] U.S. Cl. ...................................... 313/25; 313/113; 362/296
[58] Field of Search ..................... 313/8, 25, 113, 117, 313/570, 637; 362/213, 214, 296

[56] References Cited

U.S. PATENT DOCUMENTS

| | | | |
|---|---|---|---|
| 1,499,651 | 7/1924 | Grebel | 362/213 |
| 2,971,110 | 2/1961 | Schmidt | 313/570 |
| 3,017,536 | 1/1962 | Irland et al. | 313/8 X |
| 3,248,590 | 4/1966 | Schmidt | 313/637 X |
| 4,329,614 | 5/1982 | Szekacs | 313/113 X |
| 4,367,432 | 1/1983 | Glenny et al. | 313/573 X |

FOREIGN PATENT DOCUMENTS 675634  7/1952  United Kingdom ................ 362/213

Primary Examiner—Kenneth Wieder
Attorney, Agent, or Firm—Handal & Morofsky

[57] ABSTRACT

The invention concerns a head-light system for motor cars, comprising at least one or more, especially two housings (1) for head-lights and at least one light-emitting body in each housing (1), wherein the light emitting body is situated in a translucent outer vessel (4) made advantageously of glass if the housing (1) cannot be sealed hermetically and in an outer vessel (4) or without it if the housing (1) can be sealed hermetically, wherein at least one light-emitting body, and advantageously one in each housing (1) is made in form of a high-pressure gas discharge vessel (3) having a wall made of ceramics material. The main advantage of the proposed headlight system is that the visibility conditions during driving in darkness can be improved in comparison with the known solutions.

26 Claims, 2 Drawing Sheets

HEADLIGHT SYSTEM FOR MOTOR CARS

This application is a continuation of application Ser. No. 820,079, filed Nov. 26, 1985, now abandoned which is a continuation of Ser. No. 553,381, filed Nov. 18, 1983, now abandoned.

FIELD AND BACKGROUND OF THE INVENTION

The present invention relates to a head-light system for motor cars comprising at least one but if necessary more, preferably two housings for a head-light and, at least one light-emitting body, wherein the light-emitting body is arranged on the body of the motor car in a translucent outer vessel made advantageously of glass if the housing cannot be hermetically sealed and, in an outer vessel or without it, if the housing can be sealed hermetically. The head-light system of the present invention can be used especially in personal cars, it renders possible a considerable improvement in the conditions of the visibility during driving and ensures an increase of the effectiveness of lighting.

The head-lights systems designed for motor cars are known as systems of European or American-type and, comprise incandescent bodies for emitting light. These bodies are in the form of filaments. According to the European practice, the head-light systems comprise vacuum filled incandescent lamps or, with halogenic filling including one or two filaments because it is assumed that by such solution the light intensity and the effectiveness can be improved. The head-light system represents, however, a high load for the car battery even in the case when incandescent lamps with halogenic filling are used. The power which should be applied to the lamps in a head-light system of known arrangement amounts to as high as 200W which means that the load of the presently used batteries with supply voltage of 12V will go as high as 17 amps.

In the head-light systems of the American-type there is a hermetically sealed inner space wherein a filament of an incandescent body or an incandescent lamp with halogenic filling is used. This is the so-called SB-/sealed-beam/system. It can be advantageous to use two filaments or two incandescent lamps in a unit.

In the head-light systems produced for the European markets, the filaments lie mostly in lateral and in axial directions as well. This solution shows the advantage that a double function, i.e. driving lights and passing lights can be put into the same unit. The well-known incandescent lamps developed for this purpose comprise two filaments taking up a supply of 45/50W and giving a light output as high as 700/450 lm. When using incandescent lamps with halogenic filling there are also two filaments and, the power supply amounts to as high as 60/55W transformed into a light output of 1650/1000 lm value.

The special filaments used in the incandescent lamps with halogenic filling ensure small dimensions of the head-lights and a high light output in form of a highly concentrated light beam. The concentrated light beam is undesired during passing and, therefore, the beam should be scattered by the use of optical or other means. In the known head-light systems prismatic parts are used in the sealing glass of the lights.

When analysing the conditions of driving in the night, the concentrated light beam shows the disadvantages that due to the concentration the dimensions of the beam are small in cross directions and, therefore, the driver can see only a limited part of the environment. However the light beam is capable of clearly showing the road-block but the environment is hardly visible and, therefore, it is difficult to quickly and reliably make conclusions about the type of road-blocks. If better visibility conditions are to be given for the driver in the night traffic, then more intensive and wider light beam is to be emitted by the head-lights of his car. In the article of J. B. de Boer and D. A. Schreuder published in the "Lichttechnik" /No. 9 in 1969/a detailed analysis can be found about the different aspects of the use of incandescent lamps with halogenic filling in the field of lighting technics for motor cars. In the article the authors comment that incandescent lamps with halogenic filling of higher light output are capable of increasing the surface illuminated by the head-lights. By means of the known incandescent lamps with halogenic filling it has been possible to improve the light output in some directions, however, no improvement could be made in the full cross-section.

It is desirable therefore, to increase the road surface which is well illuminated by the head-lights of the car, but this can be done by means of the conventional incandescent lamps only by increasing the power supply. This can not be realized, therefore, the choice remaining is to construct a head-light system wherein light sources of higher light output should be used. However, when safety aspects are taken into account, such as a head-light should not emit a light beam which can dazzle the drivers of the motor cars driving in opposite direction. Then such solution remains undesirable.

It is understood that an increased domain of good illumination during driving, and improved lighting of the road surface can be attained by means of a higher number of head-light units, and/or by using incandescent lamps of higher power supply accompanied by use of a prismatic domain on the glass element sealing the head-light unit. The prismatic domain should be used for scattering the light in a domain as to decrease the light intensity during approaching a car driving in the opposite direction before passing.

None of the above mentioned solutions is acceptable from energy considerations because they require to increase the power input. It is also unacceptable under the international rules which demand lighting the power of the incandescent lamps used in head-light systems.

SUMMARY AND OBJECTS OF THE INVENTION

The object of the present invention is, therefore, to develop a head-light system for use in motor cars which is capable of emitting an intensive light beam and which can be characterized by a wide domain of illuminating and by avoiding the dazzling of the driver of a motor car driving in opposite direction.

The aim of the present invention is to solve the above object by a suitable construction of the head-light system in order to increase the effectiveness of the conversion of the electric energy taken up from the battery.

The present invention is based on the recognition that head-light systems can be created also by means of high-pressure gas discharge vessels.

In order to solve the object the invention provides a head-light system for motor cars comprising one, or if necessary more, especially two housings for head-lights and, at least one light-emitting body in each housing, wherein the light-emitting body is situated in a translucent outer vessel made advantageously of glass if the housing cannot be hermetically sealed and in an outer vessel or without it if the housing can be sealed hermetically and, according to the invention, at least one of and, advantageously, a higher number of light-emitting bodies are made of high-pressure gas discharge vessels having a wall made of ceramic material.

The gas discharge vessel can be equipped with an outer translucent bulb and for a light-emitting body, a gas discharge lamp can be used.

The gas discharge, vessel having a wall made of ceramics material called hereinafter a gas discharge vessel can be situated in the housing of the head-light in lateral and in axial direction as well.

An advantageous feature of the head-light system according to the invention is that for the gas discharge vessel a high-pressure sodium vapour discharge vessel can be used.

It is also advantageous to use one or more mechanically or electrically movable shading elements in the gas discharge vessel wherein the movement of the shading elements should be arranged such as to enable to change driving lights to passing lights if necessary.

Taking into account the fact that gas discharge vessels demand relatively long time for heating up, it can be advantageous to arrange at least two light-emitting bodies, i.e. in addition to the gas discharge vessel, an incandescent body or incandescent lamp, advantageously an incandescent filament should be built in into the head-light system. The arrangement should be such as to ensure a light output by the incandescent bodies only during the heating up of the gas discharge vessels. This can be reached by means of a known circuit which is capable of switching off the incandescent bodies when the gas discharge vessels are ready to emit full light. The incandescent body or the incandescent lamp can be situated in the head-light unit or separately from it, thus in a common or separate housing. In the first case, it is necessary to arrange the optical system according to the conditions of the two light-emitting bodies.

The main advantages of the head-light system according to the invention are as follows:

The luminous efficiency of the gas discharge vessels is many times higher than that of incandescent lamps with halogenic filling and, thereby it is possible to create energy saving head-light systems, wherein the power input is considerably lower than that of the head-light systems with incandescent lamps; the energy input can be a half of the known head-light systems or conversely: at the same energy input a double luminous efficiency can be obtained.

On the basis of the high luminous efficiency it is not difficult to make use of the light of the head-light system because it is not necessary to increase the light intensity to the detriment of the width of the light beam.

The life duration of the gas discharge vessels is considerably higher than that of the incandescent lamps with incandescent body and halogenic filling.

Due to the lower power input of the head-light units, the temperature of the housing is lower than that of the known units and, thereby it is possible to use various plastic elements in the housings.

A very important advantage of the head-light system according to the present invention follows from two facts: due to the features of the gas discharge vessels having a wall made of ceramics material the emitted light beam is wider and has a more uniform light beam density than that of the incandescent bodies even in case of halogenic filling and, also the dimensions of the gas discharge vessel to be used in a head-light system for a motor car, the fact that the discharge arc is placed immediately on the electrodes of the gas discharge vessel will enable the use of a usual conventional paraboloid body of rotation as a shaping element for concentrating the light beam. Therefore the quality of the passing lights and the driving lights as well can be improved.

When using the head-light system according to the invention the light distribution is very advantageous and therefore it is not necessary to make prismatic domains on the glass of the housing of the head-light unit in order to shape the beam of passing lights.

When using sodium vapour gas discharge lamps their yellow colour is very advantageous because this colour is very pleasant, not fatiguing and in fog outspokenly favourable. As experience shows the yellow light improves the contrast of the visibility; this colour is advantageous, however, if producing it by means of an incandescent lamp the efficiency of the light source becomes lower. The high-pressure sodium vapour lamps generate a primary yellow and not a white light beam. The spectrum of this yellow light is not wide, therefore it provides a high contrast of visibility possible. The efficiency of this light source is 3 . . . 4-times higher than that of the incandescent lamps with halogenic filling.

BRIEF DESCRIPTION OF THE DRAWINGS

The invention will be further described in more detail by way of example and with reference to preferred embodiments illustrated in the accompanying drawings, wherein.

DESCRIPTION OF THE PREFERRED EMBODIMENTS

Figure 1:
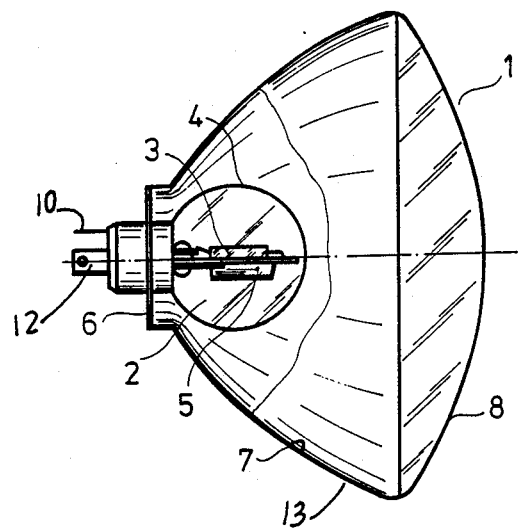
FIG. 1 shows an example of a head-light unit in cross-section for use in the head-light system according to the invention, wherein the housing of the head-light unit is not hermetically sealed and includes a sodium vapour discharge lamp.

According to the example shown in FIG. 1 a housing 1 of a head-light unit comprises a sodium vapour discharge lamp 2. This example is illustrated on the basis of a housing 1 produced by the Firm Bosch in the GFR. The sodium vapour discharge lamp 2 is equipped with a glass envelope 4 wherein a gas discharge vessel 3 is to act as the light-emitting body of the head-light unit. In a similar way, as it is usual in the case of head-light systems with incandescent lamps, the sodium vapour discharge lamp 2 includes shading elements 5 and a prefocus shield 6. The housing 1 in its reflector part 13 comprises a mirror 7 shaped in form of a rotational paraboloid for shaping the light beam. The housing 1 is closed by means of a closing plate 8 made of plain glass. The gas discharge vessel 3 lies in axial direction in the housing 1. Contracts 10 and 12 are provided for the connection to the source of energy.

Figure 2:
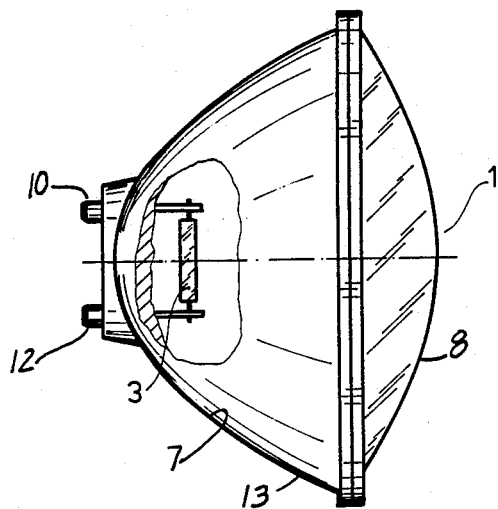
FIG. 2 shows in cross-section an example of a head-light unit for use in the head-light system according to the invention, wherein the housing of the head-light unit is hermetically sealed and includes a sodium vapour discharge lamp.

With reference to the embodiment shown in FIG. 2, it can be seen that the gas discharge vessel 3 may be placed in a hermetically sealed housing 1 of the SB-type/sealed-beam-type/. The gas discharge vessel 3 lies in a lateral direction in the housing 1 which is filled with pure nitrogen. Contracts 10 and 12 are provided for the connection to the source of energy.

Figure 3:
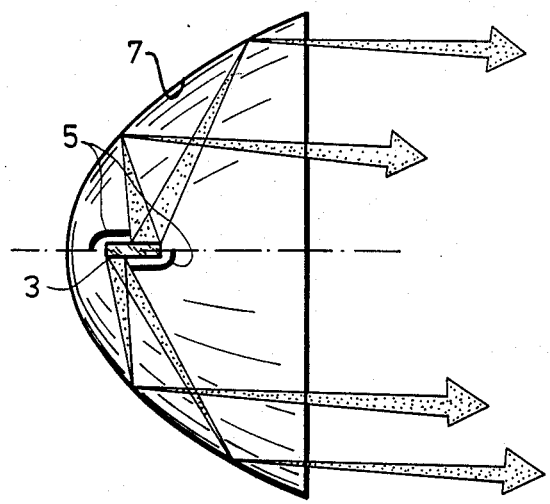
FIG. 3 shows a schematic view of the light beams in a head-light unit which comprises shading elements, a gas discharge vessel in the axial direction and a mirror shaped as a paraboloid of rotation

As shown in FIG. 3 the gas discharge vessel 3 can be placed in axial direction and provided with shading elements 5. It can be seen that the schematically illustrated output light beams are shaped by means of the mirror 7 having a shape of a paraboloid of rotation.

Figure 4:
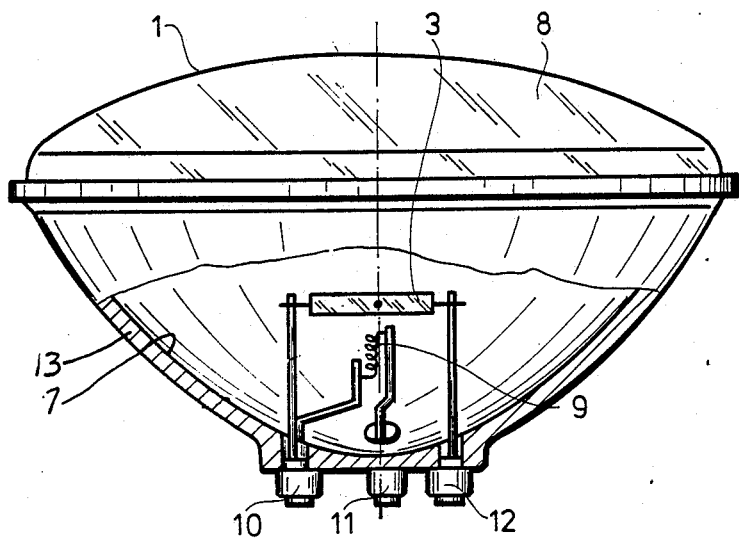
FIG. 4 shows in cross-section an example of a head-light unit for use in the head-light system according to the invention, wherein the housing of the head-light unit is hermetically sealed and includes a filament in addition to a gas discharge vessel.

In the embodiment shown in FIG. 4 the housing 1 comprises in addition to the gas discharge vessel 3 a spiral-shaped filament 9 of an incandescent body. The housing 1 includes further electric contacts 10, 11 and 12, of which contact 11 is provided for filament 9, the contact 12 for the gas discharge vessel 3 and 10 is a common contact. In order to ensure supply to the filament 9 in a defined time period/defined by the fact that the gas discharge vessel 3 does not operate or operates with a lower light output than desired/it is a known electric circuit included between the battery of the motor car and the contacts 10, 11 and 12. The housing 1, as shown in this example corresponds to that of the SB-type head-light units and comprises nitrogen as filling.

The gas discharge vessel 3 and the filament 9 can be situated in respective housings 1, wherein the housing 1 may be hermetically sealed or not. If the housing 1 has not been sealed hermetically, then filament 9 and the gas discharge vessel 3 should be placed in an outer bulb made advantageously of glass or other translucent material. This outer bulb should incorporate a gas filling, i.e. the conditions should be created as necessary to operate an incandescent lamp and a gas discharge vessel.

By means of the head-light system according to the present invention a considerable improvement of the visibility conditions during driving a motor car can be attained in darkness and at the same time, the effectiveness of the lighting can be improved.

I claim:

1. A headlight system for vehicles comprising a light-emitting body arranged in a reflector unit, said reflector unit including a housing, light-reflecting means surrounding said light-emitting body, a closing plate arranged opposite to said light-emitting body and electric input terminals for connecting said light-emitting body to an electric current source, said light-emitting body being a lamp, said lamp comprising a discharge vessel of the high-pressure sodium vapor type, said discharge vessel having a wall made of ceramic material, said discharge vessel containing a pair of electrodes and being of the type where the discharge arc is positioned substantially along a line between the electrodes of the discharge vessel, whereby the volume of an effective light emitting region is much smaller than the volume defined by the inside surface of said wall of ceramic materials.

2. A headlight according to claim 1, comprising a transparent outer vessel arranged in the housing for receiving said discharge vessel.

3. A headlight according to claim 2, wherein said transparent vessel consists of glass.

4. A headlight system as in claim 1 wherein said vessel is contained in a housing comprising a single transparent large curved and non-prismatic front face through which light passes to light a roadway and a parabolic reflector surface positioned at the side of said vessel opposite said transparent face.

5. A vehicle, comprising:
(a) a vehicle body;
(b) reflector means disposed on and secured to said vehicle body;
(c) a closed ceramic discharge vessel having a wall made of ceramic material secured with respect to said reflector means and positioned to illuminate a space in front of said reflector means upon emission of light from said vessel;
(d) high pressure sodium vapor means disposed in said vessel;
(e) an electrical power source; and
(f) electrical input terminals coupled to said power source and secured to said discharge vessel, and positioned, configured and dimensioned to excite said high pressure sodium vapor means, said discharge vessel containing a pair of electrodes coupled to said electrical input terminals and being of the type where the discharge arc is positioned immediately between the electrodes of the discharge vessel, whereby the volume of an effective light emitting body is much smaller than the volume defined by the inside surface of said wall of ceramic material.

6. A vehicle as in claim 5, wherein said ceramic discharge vessel is made of polycrystalline alumina.

7. A vehicle as in claim 5, wherein said vessel is contained within a glass envelope.

8. A vehicle as in claim 7, wherein said envelope is integrally formed with said reflector means.

9. A vehicle as in claim 7, further comprising an incandescent lamp contained within said envelope.

10. A vehicle as in claim 5, wherein said reflector means is parabolic.

11. A vehicle as in claim 5, further comprising shading elements associated with said discharge vessel.

12. A vehicle as in claim 5, further comprising a prefocusing shield associated with said discharge vessel.

13. A vehicle as in claim 12, further comprising shading elements associated with said discharge vessel and a prefocusing shield associated with said discharge vessel.

14. A headlight system as in claim 5 wherein said vessel is contained in a housing comprising a single transparent large curved and non-prismatic front face through which light passes to light a roadway and a parabolic reflector surface positioned at the side of said vessel opposite said transparent face.

15. A headlight system for a vehicle comprising:
(a) a closed ceramic discharge vessel having a wall made of ceramic material and adapted to be secured with respect to a reflector means associated with a vehicle body and positioned to illuminate a space in front of said reflector means upon emission of light from said vessel;
(b) high pressure sodium vapor means disposed in said vessel;
(c) an electrical power source; and
(d) electrical input terminals coupled to said power source and secured to said discharge vessel, and positioned, configured and dimensional to excite said high pressure sodium vapor means, said discharge vessel containing a pair of electrodes coupled to said electrical input terminals and being of the type where the discharge arc is positioned immediately between the electrodes of the discharge vessel with the diameter of said arc on the order of about one-third the inner diameter of said vessel at a point in the middle of said vessel, whereby the volume of an effective light emitting body is much smaller than the volume of said vessel.

16. A headlight as in claim 15, wherein said ceramic discharge vessel is made of polycrystalline alumina.

17. A headlight as is claim 15, wherein said vessel is contained within a glass envelope.

18. A headlight as in claim 17, wherein said envelope is integrally formed with said reflector means and adapted to be attached to a vehicle.

19. A headlight as in claim 17, further comprising an incandescent lamp contained within said envelope.

20. A headlight as in claim 18, wherein said reflector means is parabolic and surrounds said discharge vessel.

21. A headlight as in claim 15, further comprising shading elements associated with said discharge vessel.

22. A headlight system as in claim 15, wherein the distance between said two electrodes is less than 13 mm, the length of said vessel is less than 30 mm and said vessel has an internal diameter less than 4 mm.

23. A headlight system as in claim 22, wherein said vessel is contained in a housing comprising a single transparent large curved and non-prismatic front face through which light passes to light a roadway and a parabolic reflector surface positioned at the side of said vessel opposite said transparent face.

24. A headlight system for vehicles comprising a light-emitting body arranged in a reflector unit, said reflector unit including light-reflecting means surrounding said light-emitting body, a closing plate arranged opposite to said light emitting body and electric input terminals for connecting said light-emitting body to an electric current source, said light-emitting body being a high-pressure-sodium lamp, said sodium lamp comprising a discharge vessel having a wall of ceramic material and said discharge vessel containing a pair of electrodes and being of the type where the discharge arc is positioned substantially in the volume defined between the electrodes of the discharge vessel, whereby the volume of the effective light emitting body is much smaller than the area of the outside surface of said vessel.

25. A headlight system as in claim 24 wherein the effective diameter of the arc in the middle of the length of the discharge vessel is less than one-third of the internal diameter of said vessel, or said effective diameter of the arc in the middle of the length of the discharge vessel is at most equal to one-third of said inner diameter of said vessel.

26. A headlight system as in claim 25 wherein the distance between said two electrodes is less than 13 mm, the length of said vessel is less than 30 mm and said vessel has an internal diameter less than 4 mm.

* * * * *

UNITED STATES PATENT AND TRADEMARK OFFICE
CERTIFICATE OF CORRECTION

PATENT NO. : 4,891,541

DATED : January 2, 1990

INVENTOR(S) : SZEKACS

It is certified that error appears in the above-identified patent and that said Letters Patent is hereby corrected as shown below:

Claim 24.

A headlight system for vehicles comprising a light-emitting body arranged in a reflector unit, said reflector unit including light-reflecting means surrounding said light-emitting body, a closing plate arranged opposite to said light emitting body and electric input terminals for connecting said light-emitting body to an electric current source, said light-emitting body being a high-pressure-sodium lamp, said sodium lamp comprising a discharge vessel having a wall of ceramic material and said discharge vessel containing a pair of electrodes and being of the type where the discharge arc is positioned substantially in the volume defined between the electrodes of the discharge vessel, whereby the volume of the effective light emitting body is much smaller than the volume defined by the area of the outside surface of said vessel.

Signed and Sealed this

Fifteenth Day of January, 1991

*Attest:*

HARRY F. MANBECK, JR.

*Attesting Officer*     *Commissioner of Patents and Trademarks*